United States Patent [19]
Oba et al.

[11] Patent Number: 5,528,524
[45] Date of Patent: Jun. 18, 1996

[54] CALCULATING DEVICE CAPABLE OF QUICKLY FINDING A SOLUTION IN AN APPLICATION USING THE ITERATIVE METHOD

[75] Inventors: Toshiro Oba, Nara; Shuuji Kaya, Yamatokooriyama, both of Japan

[73] Assignee: Sharp Kabushiki Kaisha, Osaka, Japan

[21] Appl. No.: 260,978

[22] Filed: Jun. 15, 1994

[30] Foreign Application Priority Data

Jun. 15, 1993 [JP] Japan ..................... 5-143426

[51] Int. Cl.$^6$ ............... G06F 3/00; G06F 13/00
[52] U.S. Cl. ............... 364/709.12; 364/710.08
[58] Field of Search ............ 364/709.12, 709.01, 364/706, 710.07, 710.08, 710.11, 710.01, 709.14, 709.07, 735, 736

[56] References Cited

U.S. PATENT DOCUMENTS

| | | | |
|---|---|---|---|
| 4,761,750 | 8/1988 | Yoshino et al. | 364/709.12 |
| 5,150,316 | 9/1992 | Morita et al. | 364/709.12 |
| 5,249,147 | 9/1993 | Koumo et al. | 364/709.12 |
| 5,335,193 | 8/1994 | Kawawaki | 364/709.12 |
| 5,381,353 | 1/1995 | Oba | 364/710.08 |

FOREIGN PATENT DOCUMENTS 62-285179  12/1987  Japan .

*Primary Examiner*—Roy N. Envall, Jr.
*Assistant Examiner*—Emmanuel L. Moise

[57] ABSTRACT

In a calculating device, a control part performs arithmetic processing by an iterative method based on a mathematical expression inputted by an operator, an initial value for a variable in the mathematical expression, and a solution existing range in which a solution of the mathematical expression is expected to exist. The device has an upper limit memory for storing an upper limit of the solution existing range and a lower limit memory for storing a lower limit of the solution existing range. After calculating a value $X_{n+1}$ through an (n+1)th iterative operation from a value $X_n$ resulting from an n'th iterative operation, the control part compares $X_{n+1}$ and $X_n$. When $X_{n+1}$ is larger than $X_n$, the control part causes the lower limit memory to store $X_n$ such that $X_n$ becomes a new lower limit of the solution existing range. Further, when $X_{n+1}$ is smaller than $X_n$, the control part causes the upper limit memory to store $X_n$ such that the $X_n$ becomes a new upper limit. Then the control part discriminates whether $X_{n+1}$ is within or out of the solution existing range. When $X_{n+1}$ is within the solution existing range, the control part performs a (n+2)th iterative operation, and when $X_{n+1}$ is out of the solution existing range, the control part stops the calculation.

10 Claims, 15 Drawing Sheets

Fig. 15

| KEY INPUT | SCREEN | MEMORY CONTENTS |
|---|---|---|
| (a) [VAR] | 1:_<br>2:<br>3:<br>4: | |
| (b) [h] [a] [n] [k]<br>[e] [i] [ENTER] | 1:hankei<br>2:_<br>3:<br>4: | 01 hankei  0.<br>02          0.<br>03          0.<br>04          0. |
| (c) [QUIT] [5]<br>[STO] | 5→_ | |

Fig. 16

| | KEY INPUT | SCREEN | MEMORY CONTENTS |
|---|---|---|---|
| (d) | [VAR] | →1:hankei<br>2:<br>3:<br>4: | |
| (e) | [1] | 5→hankei           5. | 01 hankei   5.<br>02           0.<br>03           0.<br>04           0. |
| (f) | [2] [X] [π] [X] | 5→hankei           5.<br>2×π×X_ | |

Fig. 17

| KEY INPUT | SCREEN | MEMORY CONTENTS | |
|---|---|---|---|
| (g) [VAR] | →1:hankei<br>2:<br>3:<br>4: | | |
| (h) [1] | 5→hankei      5.<br>2×π×hankei_ | | |
| (i) [ENTER] | 5→hankei      5.<br>2×π×hankei =<br>31.415926 | 7⌐ 8⌐<br>01 hankei<br>02<br>03<br>04 | 6⌐<br>5.<br>0.<br>0.<br>0. |

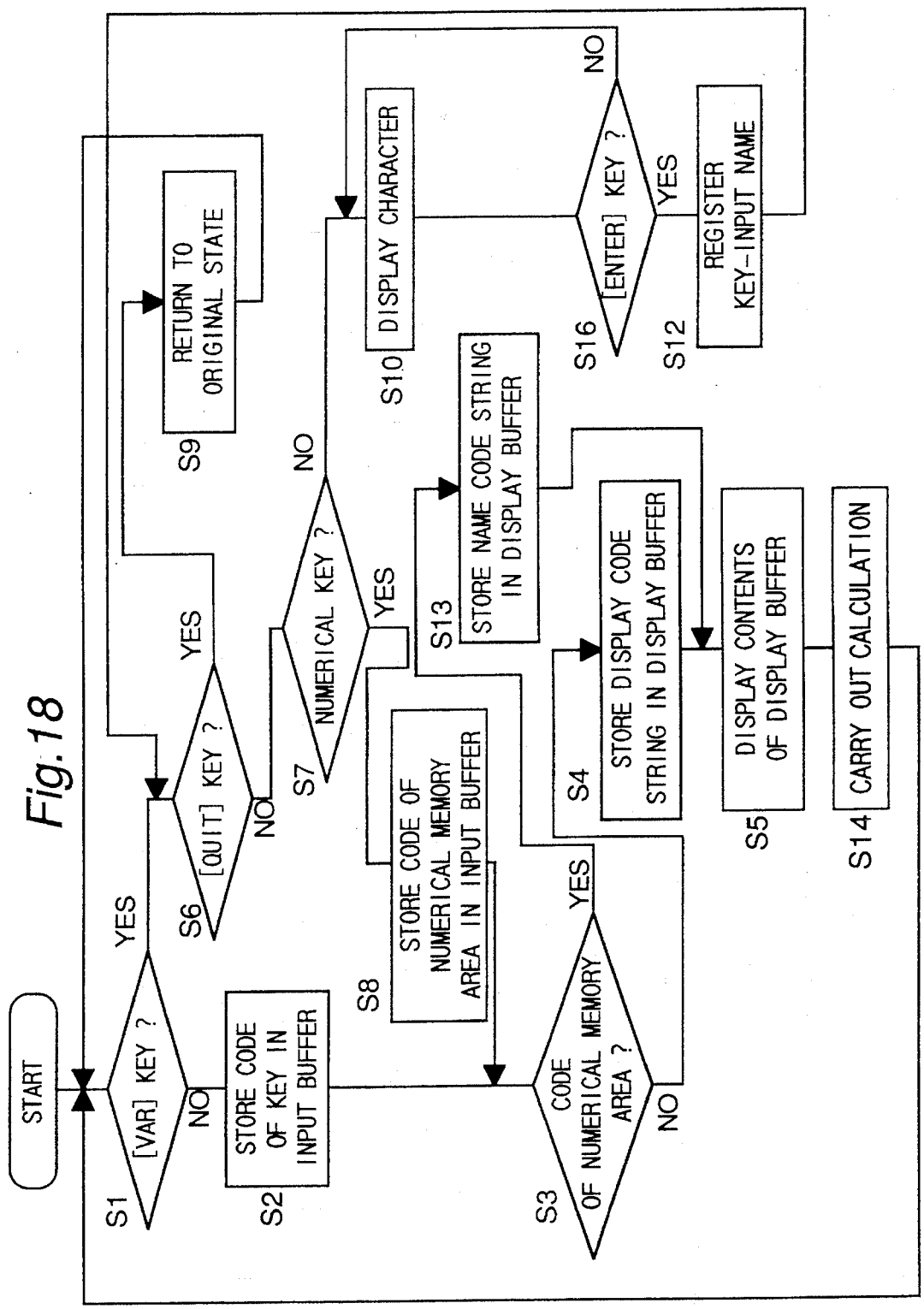

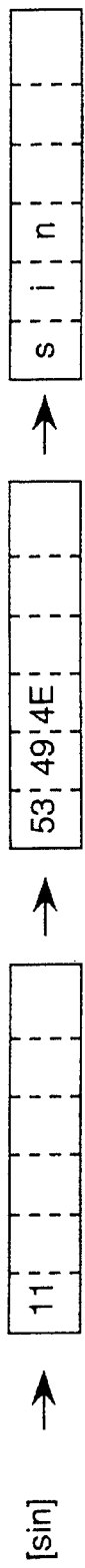

CALCULATING DEVICE CAPABLE OF QUICKLY FINDING A SOLUTION IN AN APPLICATION USING THE ITERATIVE METHOD

BACKGROUND OF THE INVENTION

1. Field of the Invention

The present invention relates to calculating devices such as a portable computer, a function calculator, a pocket computer, etc. and more particularly to calculating devices designed to get a solution by the iterative method using an equation and initial value inputted by an operator.

2. Description of the Prior Art

In the iteration method such as Newton's method and the steepest descent method, when a solution, a maximum value, or a minimum value (these values are referred to as simply "solution" below) is sought for, calculations are repeated using an initial value $X_0$. More specifically, from the initial value $X_0$ a next value $X_1$ is calculated, and then from the value $X_1$ a next value $X_2$ is calculated. A similar iterative operation is repeatedly performed until a solution is achieved. In this case, whether the solution can be achieved or not depends on the initial value. However, different equations require different initial values to achieve their respective solutions and it is therefore impossible to set the initial value in general.

FIG. 1 is a flow chart showing the execution of an application for use of the iterative method in a prior art calculating device. As shown in this figure, when this application is carried out in the prior art calculating device, an operator inputs an equation for calculation at step S201, and then inputs an initial value of a variable contained in the equation. Further, if necessary, an operator also inputs a range within which a solution is expected to exist at step S201. Such a range is referred to as "solution existing range" below. Next, at step S203, the arithmetic processing is actually done using the input equation and the input initial value. If a solution is achieved, the solution is displayed. However, when in error, an error message is displayed at step S204.

FIG. 2 shows the procedures of the arithmetic processing executed at step S203 of FIG. 1.

At first, at step S211, various work areas used for the arithmetic processing are initialized. Then, at step S212, the number of times to change the initial value in failure of the iterative operation (i.e., the loop count) is set to the counter "KAISU". For example, the loop count is 9. After that, the iterative operation is executed at step S213. FIG. 3 is a flowchart showing the concrete procedure of the iterative operation executed at step S213 of FIG. 2.

In the iterative operation processing of the prior art calculating device, various work areas used for the iterative operation are initialized at step S221, and the maximum trial number of the iterative operation (the loop count is set to the counter "count" at step S222. Thereafter, the next value $X_{n+1}$ is calculated from the current value $X_n$ at step S223. For example, in the case of Newton' method, the following expression is calculated, $$X_{n+1}=X_n-f(X_n)/f'(X_n) \quad (1)$$

where $f(X_n)$ is a value obtained by substituting $X_n$ for a variable X in the function f(X) and $f'(X_n)$ is a value obtained by substituting $X_n$ for X in the derivative of f(X).

When the calculation results in an error at step S224, this iterative operation is finished. On the other hand, if no error has happened and the next value $X_{n+1}$ has been calculated, it is discriminated at step S225 whether or not the value $X_{n+1}$ is a solution to be expected. If the value $X_{n+1}$ reaches a solution, the iterative operation is ended. On the other hand, if the value $X_{n+1}$ does not reach a solution, one is subtracted from the value of "count" at step S226 and the program returns to step S223. Thus, the loop of steps S223–S226 is repeatedly executed until the solution is achieved or the value of the counter "count" becomes zero.

Next, at step S214 (FIG. 2), it is judged whether an operation error has happened in the series of iterative operations. If there is no error and the solution is correctly calculated, or if a grammatical error (a syntax error) has happened, the arithmetic processing of S203 is ended without any further operations.

If an operation error has occurred, the value of the counter "KAISU" is decreased by one, and when the value of "KAISU" becomes zero at step S215, the arithmetic processing is ended. If the value of "KAISU" is not zero, a new initial value is generated such that the new initial value falls within the solution existing range at step S216. FIG. 4 shows a flowchart of the concrete procedure of generating the new initial value executed at step S216.

Referring to FIG. 4, supposing that the upper limit value of the solution existing range input by the operator is R.HANI, that the lower limit value is L.HANI and that new initial value is set as $X_0$, a value which is equal to the 8 equally divided part of the difference or length between L.HANI and R.HANI is set to $X_0$ at step S231. Next, at step S232, a value of (9-KAISU) is input into the counter "Acc". That is to say, each time a new initial value is generated, the value of the counter "Acc" is increased by one up to 9. Next, at step S233, a value of (L.HANI+$X_0$ * Acc) is calculated and stored in $X_0$. By so doing, initial values from L.HANI to R.HANI are given in order from the left side (the smaller side), and the loop of S213–S216 is repeatedly executed until the value of "KAISU" becomes equal to zero. FIG. 5A shows the order in which the initial values from L.HANI to R.HANI are generated and the numbers 1–9 in this figure show the order.

Then as mentioned before, if the solution is given, the solution is displayed, and if the solution could not be achieved, an error message is displayed at S204 of FIG. 1.

FIGS. 6A, 6B, 6C, 6D and 6E show display examples when Newton's method is applied in the common function calculator.

As shown in FIG. 6A, when the application using Newton's method is started, the screen displays ""EQUATION?" to invite the operator to input an equation to be solved. The operator, then, inputs the equation "$X^2-3=0$" and a value of zero as an initial value of the variable X in the equation. These input data are displayed as shown in FIGS. 6B and 6C. If necessary, the operator changes the display screen to input a solution existing range and inputs [a,b]. In this example, $a=-1\times10^{10}$, $b=1\times10^{10}$.

Then the calculator executes the arithmetic processing and displays the result, X=1.7320508, as shown in FIG. 6E. In this example, the screen indicates whether the arithmetic processing was successfully done by displaying values of the left side L and the right side R of the equation simultaneously.

But the above-mentioned prior art calculating device has the following problems.

(1) In the application to get the solution of the equation by Newton's method, equations such as $(X-2)^2+10=0$ cannot give a solution, because the equation does not have a solution of a real number. In this case, because the iterative operation is repeated a predetermined number of times and stopped finally without giving a solution, time is wasted.

(2) When solving an equation of log X=0 in the application to get the solution of the equation by Newton's method, because the value of the left side of this equation is defined only for X>0, an operation error will occur if the value of X once comes to be equal to or smaller than zero in the course of the calculation. In the case that solution existing range is divided into eight parts and that the initial value is given in order from the left side (the smaller side) as shown in FIG. 5A, if the solution existing range from −10 to 10 is set, the iterative operations for the first to fifth initial values, −10, −7.5, −5, −2.5, will result in error, and the sixth initial value 2.5 will give a solution at last. As is obvious from this, it can be said that when an error happens for some initial value, other initial values close to the initial value that has caused the error will also cause an error. Therefore, in the prior art method to give the initial values from the left side to the right side in order, it will take a long time to achieve a solution once an error is caused.

(3) When an error happens in the course of calculation, the prior art calculating device only displays an error message or again executes the iterative operation with another initial value. That is, no means for supplementing the setting of initial values after the error occurrence are provided to the prior art calculating device. Therefore the prior art calculating device cannot achieve a solution in some cases even when there is a solution, which might be achieved with an initial value generated in a different way from an initial value causing an error.

Conventional calculators and function calculators can use only a numerical memory whose memory areas each has a name consisting of a single character (for example, A, B, etc.). Therefore multi-character names of variables as used in the formula tables and the text books etc. cannot be used to input and calculate mathematical expressions. On the other hand, in a pocket computer which is programmable, multi-character names of variables can be used in the program but an operator has to do complicated operations because the program must be prepared in accordance with program rules and executed. Moreover, from the point of view of the control side, there is a problem that in a case where variables consisting of several characters are used, memory areas for storing numerical values and names representing the numerical values must be secured in, for example, the memory area for storing programs. Also, complicated control operations are required to analyze, store, and call a plurality of data codes.

SUMMARY OF THE INVENTION

A first object of the present invention is to provide a calculating device which can find a solution rapidly without requiring a complicated control in an application using the iterative method, and which can continue the arithmetic processing even though an error once occurs, so that the possibility to get the solution becomes stronger.

Another object of the present invention is to provide a calculating device which can use a name consisting of a plurality of characters for each numerical memory area and control the calculation easily.

In calculating values $X_0$, $X_1$, $X_2$, . . . in this order by the iterative method, if a graph of the function or mathematical expression is smooth, it is expected that the value $X_1$ is nearer a solution than $X_0$, the value $X_2$ is nearer the solution than $X_1$, and so on. For example, when the value $X_1$ calculated from $X_0$ moves to the right side (larger side) of $X_0$, it is expected that the position of the solution to be sought is on the right side of $X_0$. However, if a value $X_n$ is on the left side (smaller side) of $X_0$ and the next value $X_{n+1}$ is on the opposite, right side of $X_0$, it can be expected that the subsequently obtained values are apt to go to and fro around the same region and that the probability of finding no solution is strong even if the calculation is continued.

In light of this observation, in order to accomplish the first object, the present invention provides a calculating device having a key part for key-inputting various data, a control part for executing arithmetic processing by an iterative method based on a mathematical expression inputted by an operator, an initial value for a variable contained in the mathematical expression, and a solution existing range in which a solution of the mathematical expression is expected to exist, and a display part for displaying various data including key-input data and results of the arithmetic processing, comprising:

an upper limit memory for storing an upper limit of the solution existing range; and a lower limit memory for storing a lower limit of the solution existing range;

wherein, after calculating a value $X_{n+1}$ through an (n+1)th iterative operation from a value $X_n$ resulting from an n'th iterative operation, the control part compares the value $X_{n+1}$ and $X_n$, and when $X_{n+1}$ is larger than $X_n$, the control part $X_n$ causes the lower limit memory to store the value $X_n$ such that the value $X_n$ becomes a new lower limit of the solution existing range, and when $X_{n+1}$ is smaller than $X_n$, the control part $X_n$ causes the upper limit memory to store the value $X_n$ such that the value $X_n$ becomes a new upper limit of the solution existing range, and then the control part discriminates whether $X_{n+1}$ is within or out of the solution existing range and when the value $X_{n+1}$ is within the solution existing range, the control part performs a (n+2)th iterative operation, and when the value $X_{n+1}$ is out of the solution existing range, the control part stops the operation.

That is, according to the calculating device, the solution existing range is limited to a narrower range on the basis of the intermediate result $X_n$ of the iterative operation. More specifically, when $X_{n+1}$ calculated from $X_n$ is larger than $X_n$, i.e., the value $X_{n+1}$ is on the right side of the value $X_n$, values on the left side of $X_n$ (i.e., values smaller than $X_n$) are removed from the solution existing range. On the other hand, when $X_{n+1}$ calculated from $X_n$ is smaller than $X_n$, i.e., the value $X_{n+1}$ is on the left side of the value $X_n$, values on the right side of $X_n$ (i.e., values larger than $X_n$) are removed from the solution existing range. In this way, the solution existing range is limited. And, if the calculation result $X_{n+1}$ is out of the limited solution existing range, a search for the solution is stopped at once, whereby waste of time is avoided and the operation speed increases.

An assumption that once calculation results start going to and fro around the same region, a real solution is not achieved at all even if the calculation continued is not correct from the mathematical point of view. There are many mathematical expressions which can be solved if the calculation is continued until they are solved. However, it can be empirically said that in most common mathematical expressions, once the calculation results go to and fro, the solution cannot be achieved. The calculating device according to the first aspect of the present invention is based on such law of experience.

In order to the first object, the present invention further provides a calculating device having a key part for key-inputting various data, a control part for executing arithmetic processing by an iterative method based on a mathematical expression inputted by an operator, an initial value for a variable contained in the mathematical expression, and a solution existing in the range in which a solution of the mathematical expression is expected to exist, and a display part for displaying various data including key-input data and results of the arithmetic processing, characterized in that:

the control part uses one of upper and lower limits of the solution existing range as the initial value for a first series of iterative operations and the other of the upper and lower limits as the initial value for a second series of iterative operations. In further series of iterative operations the control part uses as the initial value a value that is selected from among values positioned at points dividing the solution existing range into $2^m$ (m=1, 2, ...) while successively increasing degree "m" from the least degree "1", and a value that is at a farthest point from a point of an immediately preceding initial value.

For example, after execution of the first series of iterative operations using the lower limit as the initial value and the second series of iterative operations using the upper limit as the initial value, a value at the point dividing the solution existing range into 2 (=$2^1$) between the lower and upper limits (values at the left end and right end) is given as the new initial value. Next, values at the points dividing the solution existing range into four ($2^2$), exclusive of the points dividing the range into two, are given as the new initial values one by one. Next, values at the points dividing the solution existing range into eight ($2^3$), exclusive of the points dividing the range into two and four, are given as the new initial values. The value of "m" is determined based on the number of times of generation of the initial value (loop count stored in a counter).

The initial value generation technique as described above and adopted in the calculating device according to the second aspect of the present invention allows obtainment of a solution with a fewer trials, as compared with the prior art.

Now consider the case, for example, that the solution of the function f(X) is sought. Suppose that after the several iterative operations, an error happens in the calculation of $X_{n+1}$ from $X_n$, that is, in the calculation of $f(X_n)$. From the fact that calculation of $f(X_{n-1})$ was successful but that calculation of $f(X_n)$ was not successful, it is considered that it is a strong possibility that the intermediate calculation result has entered the region to cause an error by jumping over the position of the solution, and that it is a strong possibility that a solution can be found by searching the region between $X_{n-1}$ and $X_n$. However, in order to search for a solution in the region between $X_{n-1}$ and $X_n$, another arithmetic processing using an iterative method different from that having caused the error is required.

Accordingly, to satisfy this requirement, a calculating device according to a third aspect of the present invention comprises a first memory for storing a value $X_n$ resulting from an n'th iterative operation and a second memory for storing a value $X_{n-1}$ resulting from an (n-1)th iterative operation. In this calculating device, when an operation error occurs during an (n+1)th iterative operation to calculate a value $X_{n+1}$, the control part gives an average of the values $X_n$ and $X_{n-1}$ stored in the first and second memories respectively as a new $X_n$ and calculates the value $X_{n+1}$ on the basis of the new value of $X_n$ again.

With the arrangement of this calculating device, even if a value of the variable enters an undefined region and an error occurs during the iterative operation, the possibility of obtaining a solution is made stronger. Furthermore, a solution can be found from the initial value in a wider range.

In order to accomplish the second object, the calculating devices of the present invention as mentioned above each may comprise:

an input buffer for storing a control code representative of data inputted by the key part;

a display buffer for storing a display code string representative of a character string corresponding to the control code stored in the input buffer, the character string being displayed on the display part;

a numerical memory for storing numerical values in respective memory areas of the numerical memory;

a code memory for storing control codes to identify the respective memory areas of the numerical memory; and a name memory for storing names, each consisting of one or more characters inputted in correspondence with the numerical values stored in the numerical memory.

With this arrangement, when there is a key input, the control part judges whether or not a memory area of the numerical memory is selected. When a memory area of the numerical memory is selected, the control part reads out the control code corresponding to the selected memory area from the code memory and stores the control code in the input buffer to use the control code in calculation. At the same time, the control part reads out the name corresponding to the selected memory area from the name memory and stores the name in the display buffer to display the name on the display part. That is, the calculating operation can be done as easily as in common function calculators, through the use of the control codes corresponding to the numerical memory areas. And in the display part, the names stored in the name memory in correspondence to each numerical memory area are presented. Therefore an operator can specify the numerical memory area by the displayed corresponding name and use it for the calculation.

BRIEF DESCRIPTION OF THE DRAWINGS

The present invention will become more fully understood from the detailed description given hereinbelow and the accompanying drawings which are given by way of illustration only, and thus are not limitative of the present invention, and wherein:

FIGS. 15–17 are explanatory illustrations to explain the operation of the calculating device of the invention when the numerical memory is used, showing keys operated by the operator in the left column, display contents on the screen when the keys are operated in the middle column, and memory contents in the right column, respectively;

FIG. 18 is a flowchart of an operation of the calculating device of FIG. 7 wherein the numerical memory is used;

FIGS. 19A, 19B, 19C, and 19D are illustrations to explain how a key-input data is stored and displayed, wherein FIG. 17A shows an operated key, FIG. 17B shows a control code of the key stored in an input buffer, FIG. 17C shows a display code string stored in a display buffer and FIG. 17D shows display contents; and FIG. 20 shows examples of input keys, control codes (C.C.) stored in the input buffer, display codes stored in the display buffer, and display contents.

DETAILED DESCRIPTION OF THE PREFERRED EMBODIMENTS

Figure 7:
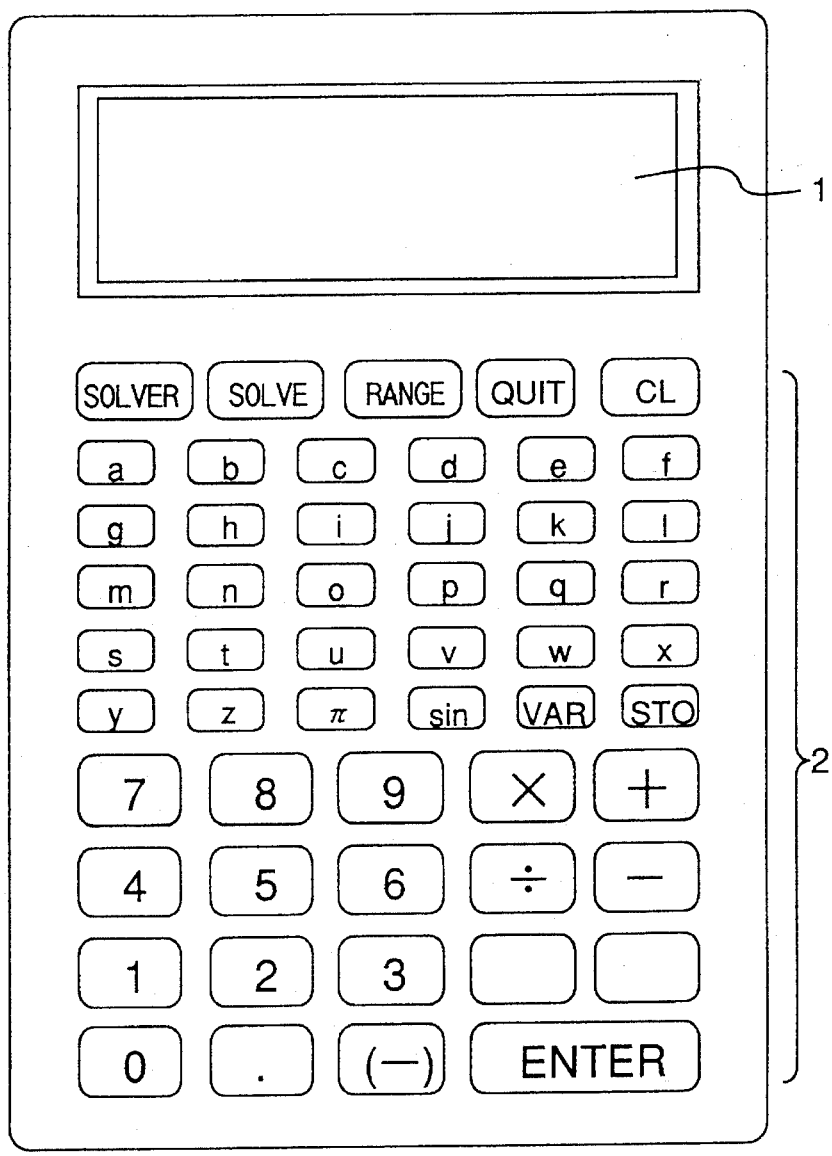
FIG. 7 is a top view showing an appearance of a calculating device according to an embodiment of the present invention.

FIG. 7 shows an appearance of a calculating device according to an embodiment of this invention. This device has a display part 1 consisting of a liquid crystal display device (LCD) and a key part 2 as an input part on the front. The key part 2 has numerical keys [0], [1], [2], [3], [4], [5], [6], [7], [8], [9], [.] and [(−)]; arithmetic-operation keys [×], [÷], [+] and [−], and alphabetical keys [a]–[z]; and an execution key [enter] for allowing data registration and execution of calculation. Further, the calculating device has various function keys such as a key [QUIT] for returning the device to the former state, a key [CL] for returning the device to the initial state, a key [π] for calculating the ratio of the circumference of a circle to its diameter, a key [SOLVER] for starting an application wherein a solution is calculated by the iterative method, a key [SOLVE] for starting calculations in that application, a key [RANGE] for bringing the device into a state enabling input of a solution existing range, a key [STO] for registering key-input numerical values in a numerical memory, and a key [VAR] for registering names of areas of the numerical memory and also for changing the display part 1 to the memory selecting screen.

Figure 8:
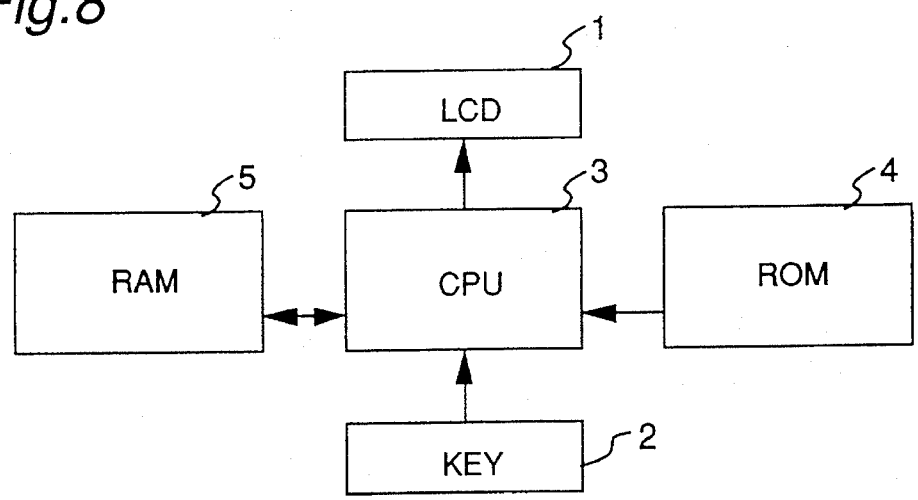
FIG. 8 is a block diagram showing a structure of the hardware of the calculating device of FIG. 7.

As shown in FIG. 8, this device has a CPU (Central Processing Unit) 3 connected with the display part 1 and the key part 2, a ROM (Read Only Memory) 4 and a RAM (Random Access Memory) 5. In response to input (key input) from the key part 2, the CPU3 carries out processing as described later and controls the display part 1 to display various information such as mathematical expressions, key-input information, calculation results, etc. The ROM 4 stores various control programs used by the CPU3 to control operations such as the key input operation and display operation. The ROM 4 also stores data of various constants and a character generator for display. The RAM 5 has the numerical memory 6 (see FIGS. 13–15) for storing a plurality of numerical data (numbers, equations) inputted by a user in its respective areas, and buffers for storing various information used for executing and controlling the key input, calculation, and display of input information and calculation results. The RAM 5 also has a code memory 7 to store control codes 01,02,03,04 . . . to identify respective memory areas of the numerical memory 6, and a name memory 8 to store names consisting of one or more characters and directed to the respective numerical memory areas, as shown in FIGS. 15–17 and described in more detail later.

Figure 1:
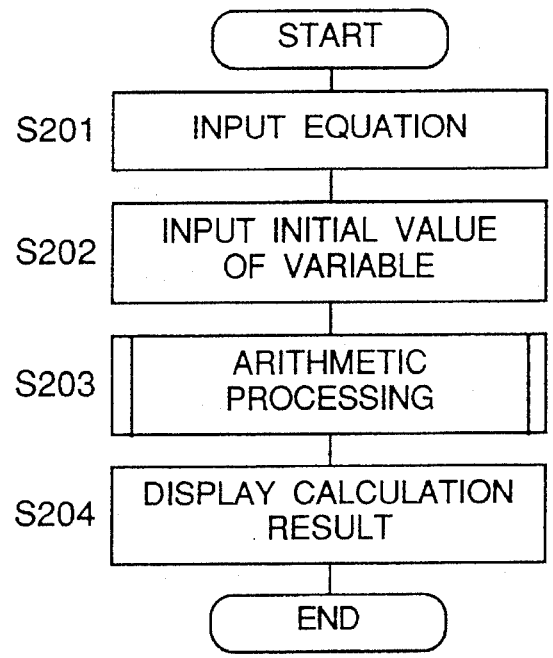
FIG. 1 is a flow chart showing the operation of a prior art calculation.
Figure 9:
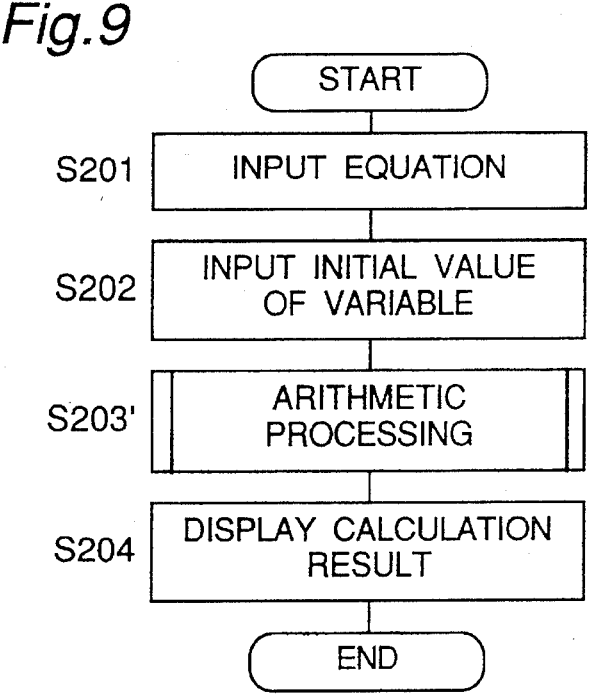
FIG. 9 is a flow chart of the operation of the calculating device of FIG. 7.

This calculating device works basically along the flow similar to that shown in FIG. 1 as a whole, in a situation where the iterative method is carried out. That is to say, as shown in FIG. 9, the operator at first inputs an equation for the calculation (step S201) and then inputs an initial value of the variable in the input equation and, if necessary, a solution existing range (upper and lower limits) as well (step S202). Next, an arithmetic processing is carried out using the input equation and the input initial value (S203'). Finally, the calculation result is displayed. More specifically, when a solution is obtained, the solution is displayed, but when some error happens, an error message is displayed (S204).

Figure 10:
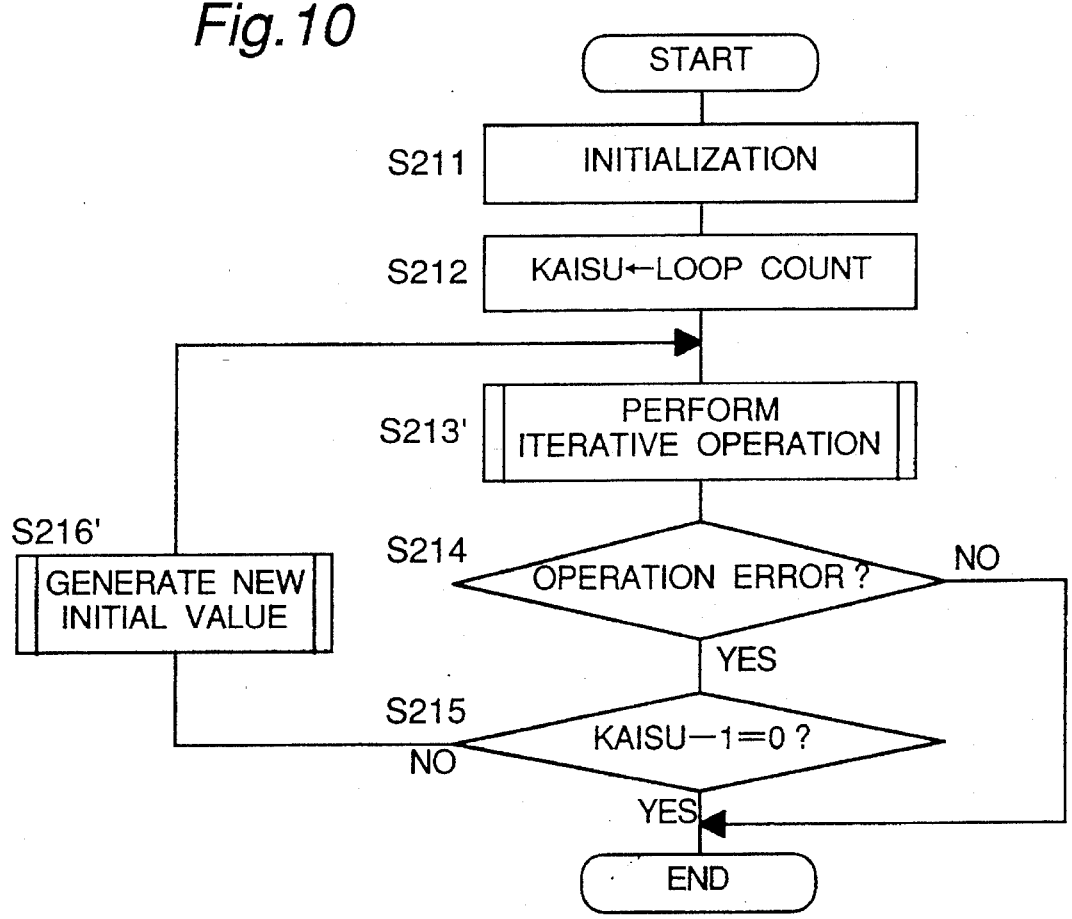
FIG. 10 is a flow chart showing an example of the arithmetic processing executed at step S203' of FIG. 9.

The device executes the arithmetic processing of step S203' in the routine shown in FIG. 10. As can be seen, the routine of FIG. 10 is similar to the prior art arithmetic processing shown in FIG. 2.

Figure 2:
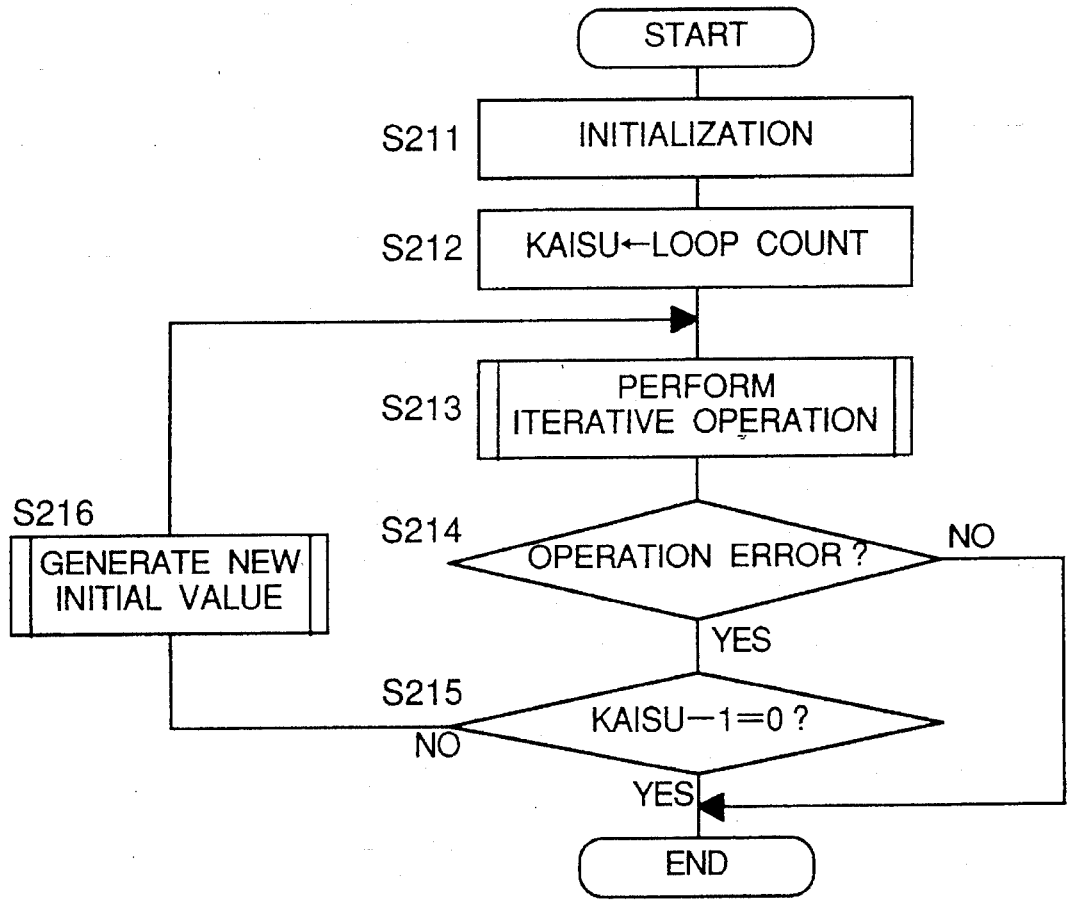
FIG. 2 is a flow chart showing the arithmetic processing executed at step S203 of FIG. 1.
Figure 3:
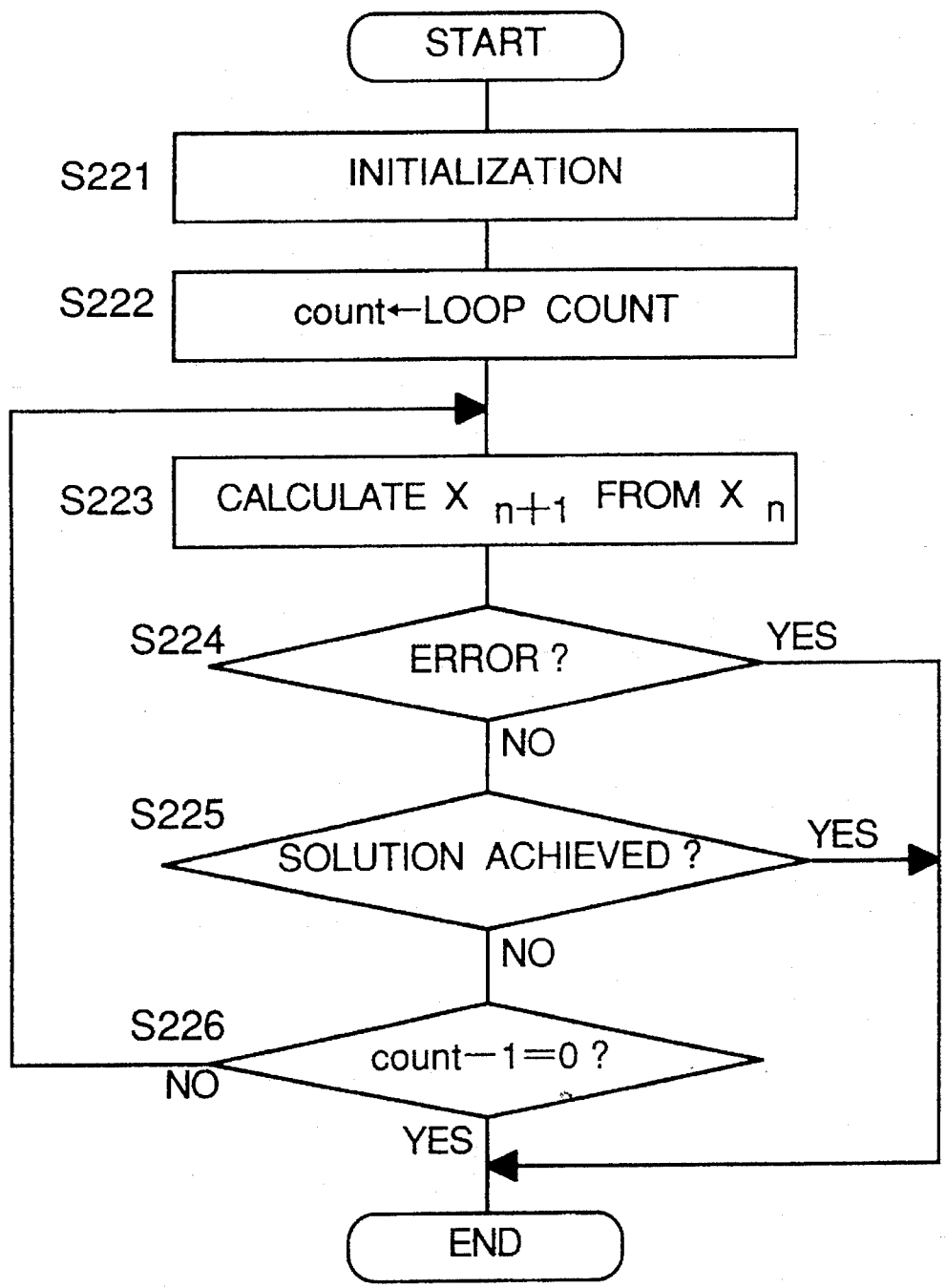
FIG. 3 is a flow chart showing the iterative operation processing executed at step S213 of FIG. 2.
Figure 4:
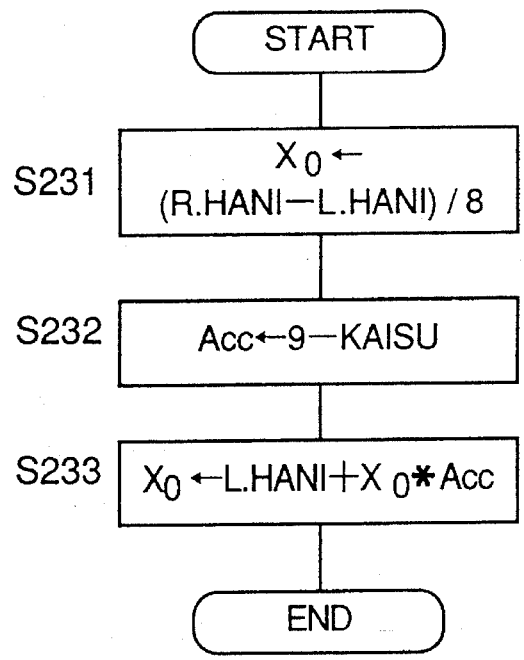
FIG. 4 is a flow chart showing the operation to generate the new initial value, executed at step S216 of FIG. 2.
Figure 11:
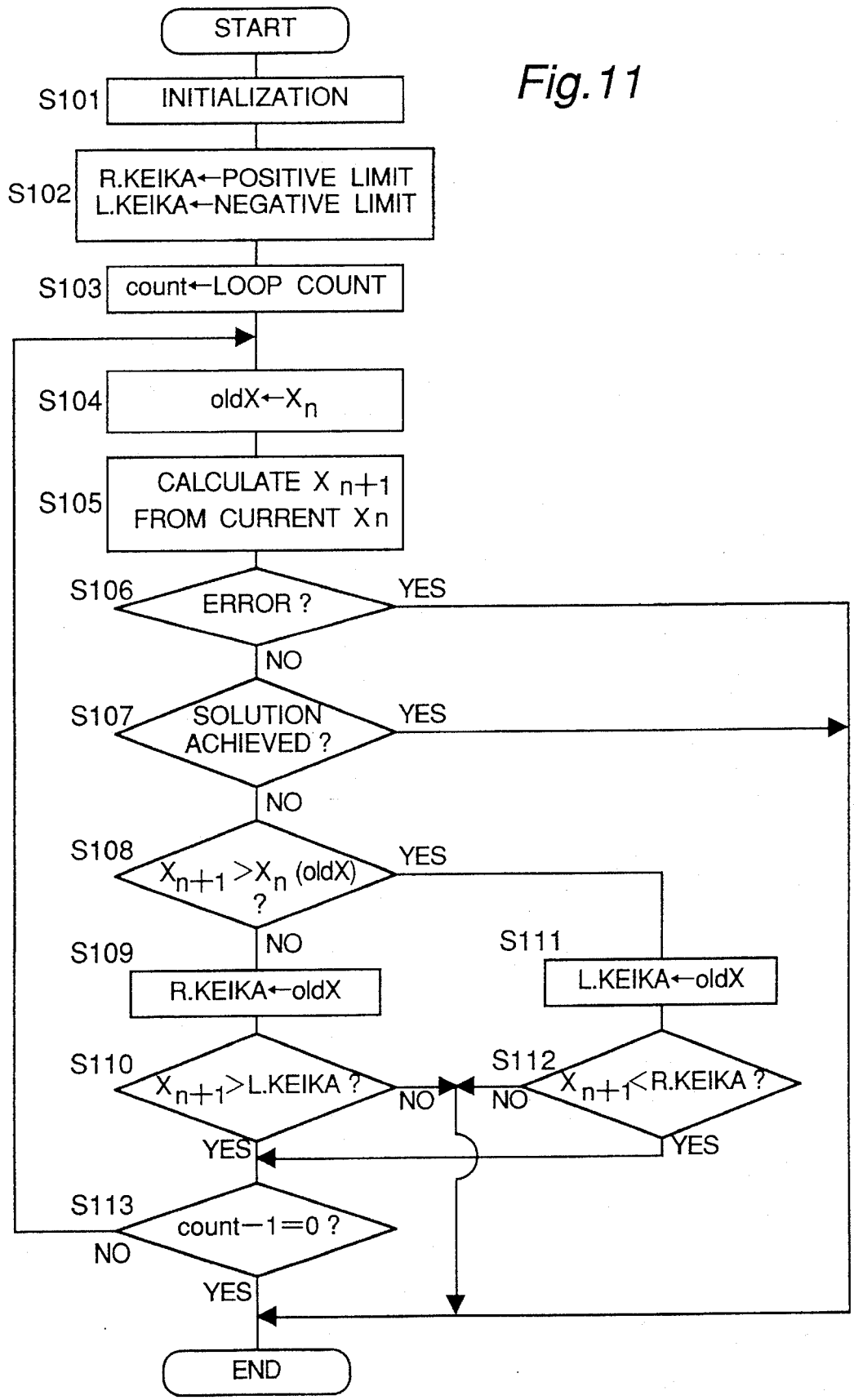
FIG. 11 is a flow chart showing an example of the iterative operation processing executed at step S213' of FIG. 10.

However, in executing the arithmetic processing of step S203' the calculating device of the present embodiment carries out the following iterative operation at step S213' in accordance with the routine shown in FIG. 11, instead of the prior art iterative operation carried out at step S213 in FIG. 2 in accordance with the routine of FIG. 3. Also, after the step S215 is executed, the calculating device of the present embodiment generates a new initial value at S216' in the improved manner as described later.

The following describes the iterative operation of S213' in the arithmetic processing performed at step S203'. The steps S211, S212, S214, S215 of FIG. 10 are the same as those of FIG. 2, so that description on those steps is omitted here.

In this embodiment, "R.KEIKA" is newly set up as an upper limit memory and "L.KEIKA" as a lower limit memory in a work area within the RAM 5. Also, a memory "old X" is set up for storing the preceding value $X_n$ of a variable X.

At first, at step 101, various work areas used for the iterative operation are initialized.

Before entering the loop, the initial setting is done for R.KEIKA and L.KEIKA, which respectively represent the upper limit and the lower limit of the solution existing range at step 102. At this step a positive limit value and a negative limit value of the variable X to be calculated are input because there is no calculation result at first. At next step S103, the maximum number of times of trials (i.e., the loop count) of the iterative operation is stored in the counter "count".

Next, at step S104, the present value $X_n$ of X is stored in "oldX." This storage is carried out for the purpose of comparing a new intermediate calculation result $X_{n+1}$ with the preceding intermediate calculation result $X_n$ in a later step S108 during the iterative process.

Next, at step S105, the value $X_{n+1}$ is computed from the $X_n$. For example, in Newton's method, the following is calculated.

$$X_{n+1} = X_n - f(X_n)/f'(X_n) \qquad (1)$$

where $f(X_n)$ is a value obtained by substituting $X_n$ for a variable X in the function f(X) and $f'(X_n)$ is a value obtained by substituting $X_n$ for X in the derivative of f(x).

If it is discriminated at step S106 that some error has happened during this calculation, this iterative operation is finished.

If there is no error and the value $X_{n+1}$ is calculated, it is discriminated at step S107 whether $X_{n+1}$ is a solution to be expected or not and, and in the case that the solution is given, the operation is finished.

On the other hand, if the solution is not achieved, the program goes to step S108 at which it is discriminated whether the value $X_{n+1}$ has moved to the right or to the left with respect to the value $X_n$ stored in "old X". That is, it is determined whether or not the value $X_{n+1}$ is larger than the value $X_n$ in the "oldX". If $X_{n+1}$ has moved to the left with respect to the $X_n$ ($X_{n+1}<X_n$), the value $X_n$ in the memory "oldX" is set to R.KEIKA at step S109. Successively, it is discriminated at step S110 whether or not $X_{n+1}$ is out of the solution existing range defined by the value of R. KEIKA and the value of L. KEIKA. In this case, because $X_{n+1}$ is on the left side of $X_n$ in "oldX" (R.KEIKA), $X_{n+1}$ is compared with only the value of L.KEIKA. On the other hand, if the value $X_{n+1}$ has moved to the right with respect to the value $X_n$ in "old X" ($X_{n+1}>X_n$) at step S108, the value $X_n$ in "oldX" is set to L.KEIKA at step S111. Then, it is discriminated at step S112 whether $X_{n+1}$ is out of the solution existing range defined by the value of R.KEIKA and the value of L.KEIKA or not. In this case, because $X_{n+1}$ is on the right side of $X_n$ in "oldX" (L.KEIKA), $X_{n+1}$ is compared with only the value of R.Keika at step S112. If $X_{n+1}$ is determined to be out of the solution existing range defined by R.KAIKA and L.KEIKA ($X_{n+1}$ is equal to or smaller than L.KEIKA or X is equal to or larger than R.KEIKA) at S110 or S112, this iterative operation is ended.

On the other hand, if $X_{n+1}$ is in the solution existing range (i.e., R.KEIKA>$X_{n+1}$>L.KEIKA), one (1) is subtracted from the value of the counter "count" at step S110, and at next step S113 it is judged whether the current value of "count" is equal to zero (i.e., the operation has been already repeated the loop count set up in S103) or not. If the value of "count" is equal to zero, this operation is ended. On the other hand if it is not equal to zero, the loop of S104–S113 is repeatedly executed until the solution is given or the intermediate calculation result is out of the solution existing range.

As mentioned above, the solution existing range is defined on the basis of the range within which the intermediate calculation result $X_{n+1}$ moves and the search for the solution is stopped once the intermediate result $X_{n+1}$ gets out of the solution existing range. Thus, wasting of time can be avoided and it is possible to execute the arithmetic processing rapidly.

Figure 12:
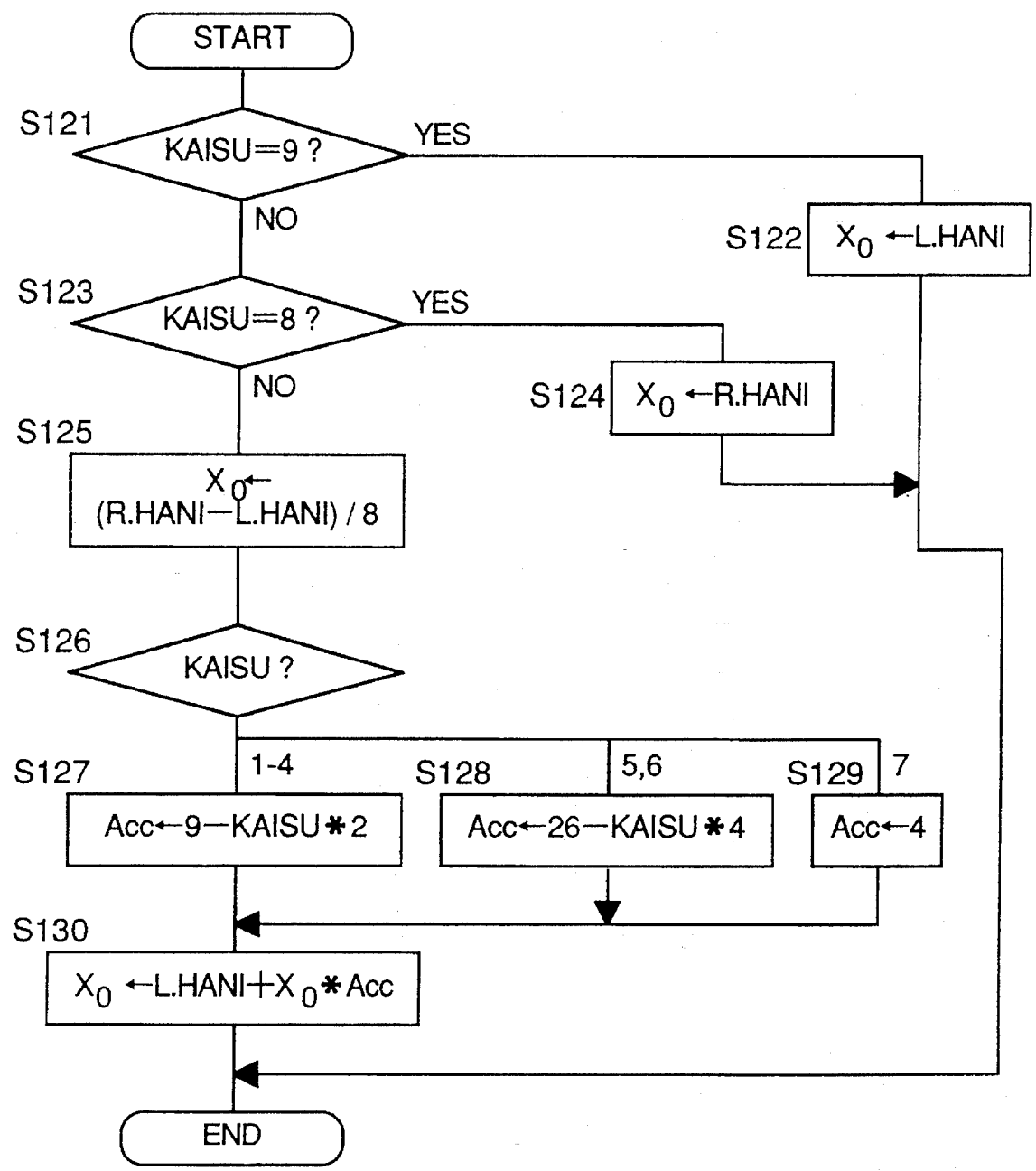
FIG. 12 is a flow chart showing an example of the operation to generate the new initial value, executed at step S216' of FIG. 10.

The following describes the way of generating a new initial value in the arithmetic processing, with reference to FIG. 12.

Note that the value of the counter "KAISU" decreases by one from 9 to 1 each time this initial value generation processing is executed at step S216.

The lower limit (the left end) of the solution existing range input by the operator is defined as L.HANI, the upper limit (the right end) as R.HANI, and a storage for the new initial value is defined as X.

At first, at step S121, the value of the counter "KAISU" is checked and in the case of KAISU=9 (the first call), the value of L.HANI (the left end) is let to be the initial value $X_0$ at step S122. In the case of KAISU=8 (the second call) at step S123, the value of R.HANI (the right end) is let to be the initial value$_0$ X at step S124. If the value of KAISU is neither 9 nor 8, a value of one eighth part of the length between the value of L.HANI and that of R.HANI is set as $X_0$ at S125. Next, at step S126 the value of KAISU is checked. In the case of KAISU=7, a value of 4 is set in the counter "Acc" at step S129, a value of (L.HANI+$X_0$ * Acc) is set as the initial value $X_0$ at S130. In this case, as Acc=4, the initial value $X_0$ is in the middle of the positions of the values of L.HANI (the left end) and R.HANI (the right end). That is, a point that divides the length between L.HANI and R.HANI is set as the initial value $X_0$.

In the case that the value of KAISU is 5 or 6 at S126, a value of (26–KAISU*4) is set in the counter "Acc" at step S128, and similarly a value of (L.HANI+X*Acc) is set as the initial value $X_0$ at step S130. In this case, a point positioned in the middle of the initial value $X_0$ for the KAISU=7 case and the value of L.HANI or R.HANI is set as the initial value $X_0$. In other words, a point which divides the length between L.HANI and R.HANI into four, exclusive of the initial values for the KAISU=7, is set as the initial value $X_0$.

Also, if the value of KAISU is 1, 2, 3, or 4 at step S126, a value of (9–KAISU*2) is set in the counter "Acc" and a value of (L.HANI+$X_0$*Acc) is set as the initial value $X_0$ at step S130. In this case, the initial value $X_0$ is a point positioned between the points for the initial values for KAISU=7 and KAISU=5 or 6, or a point positioned between the points for the initial values for KAISU=5 or 6 and R.HANI or L.HANI. That is, a point which divides the length between L.HANI and R.HANI into eight, exclusive of the initial values for the KAISU=7 and the KAISU=5, 6, is set as the initial value $X_0$.

Figure 5A:
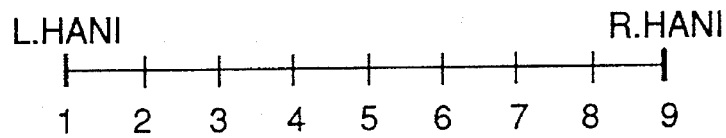
FIG. 5A is a diagram explaining the order to set up the initial value for the iterative operation in the prior art.
Figure 5B:
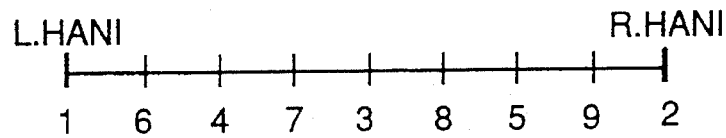
FIG. 5B is a diagram explaining the order to set up the initial value for the iterative operation in the present invention.
Figure 6A:
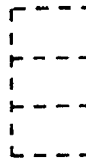
FIGS. 6A, 6B, 6C, 6D˙and 6E show display examples when Newton's method is applied in the common function calculators.
Figure 6B:
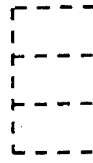
Figure 6C:
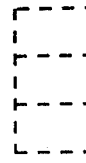
Figure 6D:
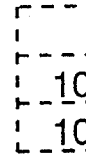
Figure 6E:
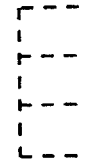

By setting the initial value $X_0$ in the above way, an initial value which exists in the position farthest from the initial value adopted within the solution existing range in the past can be adopted, as shown in FIG. 5B wherein the numbers 1–9 indicate the order in which the points are adopted as the initial value. Accordingly, it is expected that the solution can be obtain in fewer trials than in the prior art.

For example, assume that an application solving an equation by Newton's method is adopted and that a solution to satisfy the equation log X=0 is sought. After the calculation for the first initial value $X_0$ of –10 results in error, a value of 10 is adopted as the second initial value $X_0$. This second initial value gives a solution. As obvious, the initial value generation method of this embodiment allows the solution to be given by the smaller number of trials than that of the above-mentioned prior example (6 trials).

Figure 13:
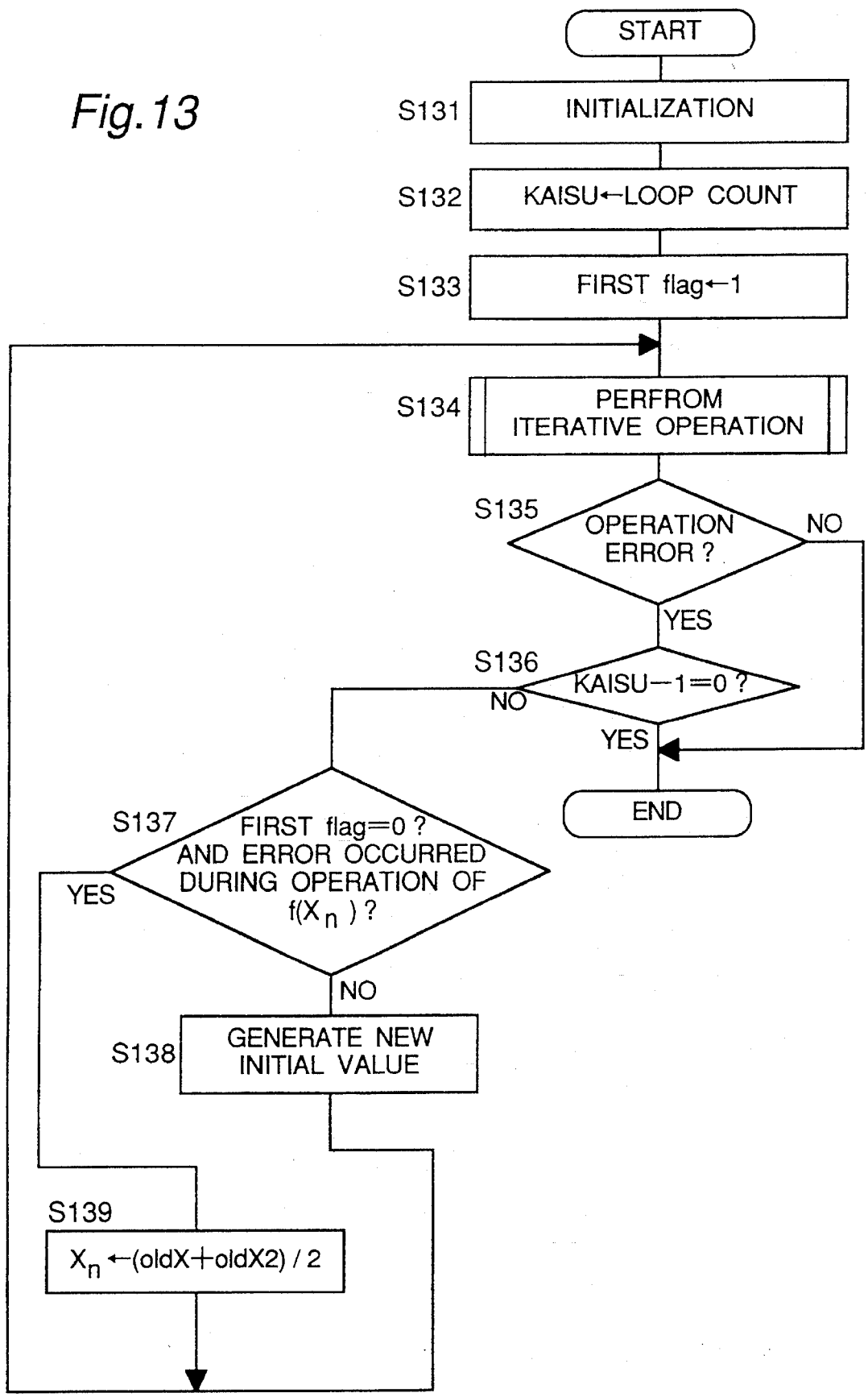
FIG. 13 is a flow chart showing a further example of the arithmetic processing executed at step S203' of FIG. 9.

When a solution is not found and the calculation results in error in the above arithmetic processing of FIG. 10, a further arithmetic processing shown in FIG. 13 is carried out. This arithmetic processing involves the iterative operation processing shown in FIG. 14.

In order to execute the arithmetic processing of FIG. 13, a flag "FIRST flag" is set up as a control flag in the work area of RAM 5 shown in FIG. 8. Also a second memory "oldX2" is newly set up to store an intermediate result of the calculation.

At first, the initialization of the every work area for the calculating operation is done at step S131. Next, at step S132, a value of 9 is set to the counter KAISU as the number of times to renew the initial value $X_0$ in case of the failure of the operation (i.e., the loop count). Next, a value of 1 is set as the initial value of the "FIRST flag".

Figure 14:
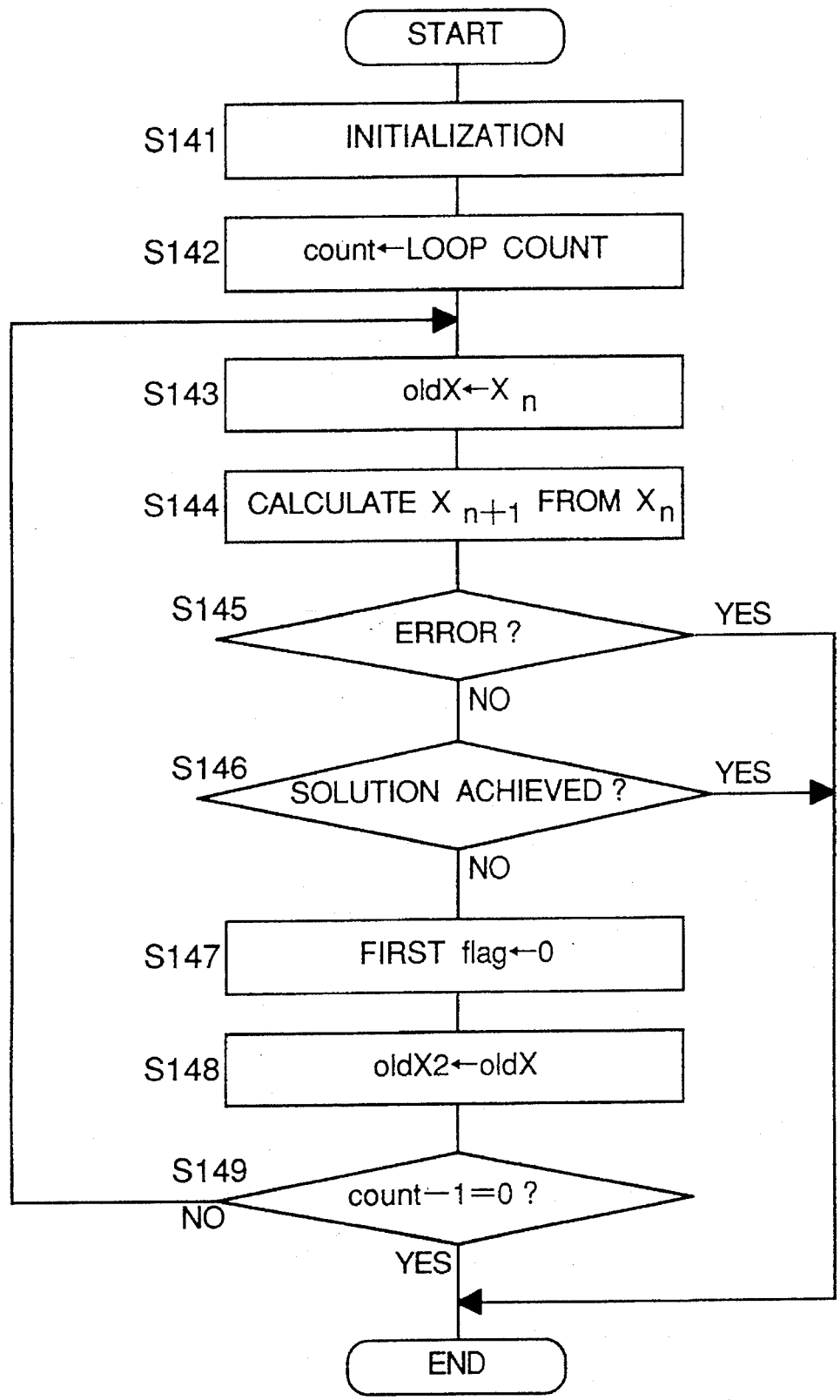
FIG. 14 is a flow chart showing an example of the iterative operation processing executed at step S134 of FIG. 13.

Next, the iterative operation is done at step S134. Specifically, a processing shown in FIG. 14 is executed as follows. At first, every work area for the iterative operation is initialized at step S141 and the maximum number of trial operations (i.e., the loop count) is input into the counter "count" at step S142. Next, after the value of the present $X_n$ is stored in the memory oldX at step S143, the next value $X_{n+1}$ is calculated from $X_n$ at step S144. For example, in Newton's method, the following is calculated.

$$X_{n+1}=X_n-f(X_n)/f'(X_n) \qquad (1)$$

where $f(X_n)$ is a value obtained by substituting $X_n$ for a variable X in the function f(X) and $f'(X_n)$ is a value obtained by substituting $X_n$ for X in the derivative of f(X).

When it is judged at step S145 that some error has happened in this calculation, this iterative operation is ended. If there is no error and the new value $X_{n+1}$ has been calculated, it is then judged at step S146 whether the new value $X_{n+1}$ is a solution of the input equation. If it is determined at step S146 that the solution is achieved, the iterative operation is finished. On the other hand, if the solution is not achieved, a value of 0 is input in the FIRST flag to indicate that the new value $X_{n+1}$ has been correctly calculated (S147). And the value of the memory "oldX" is stored in the memory "oldX2" at step S148. Then, at step S149, the value of "count" is decreased by one, and the program returns to S143 and the loop of steps S143–S149 is repeatedly executed until the solution is achieved or the value of "count" representing the remainder loop count becomes zero.

Next, referring to FIG. 13 again, at step S135, it is judged whether or not some operation error has happened in the iterative operation procedure performed at step S134. If no error has happened and the solution has been obtained or if some syntax error has occurred to the mathematical expression itself, this arithmetic processing is ended. Otherwise, for example, if an operation error has happened, the value of "KAISU" is decreased by one at step S136, and when the value of "KAISU" (the loop count) becomes zero, this calculating operation procedure is ended.

If the value of "KAISU" is not zero at step S136, then it is judged at step S137 whether FIRST flag=0 or not. In other words, it is judged whether or not there was a successful calculation in getting the value of X (S144 of FIG. 12). Simultaneously, it is also judged at step S137 whether or not the error happened during the calculation of $f(X_n)$ happened. This judgement or determination is done to determine that $X_n$, which was at least once at the position making $f(X_n)$ calculable, has now entered a region where it is impossible to calculate $f(X_n)$. If the value of "FIRST flag" is not zero or if the error did not occur during the calculation of $f(X_n)$, a new initial value falling in the solution existing range set up by the operator is generated at step S138. At this step S138, the aforementioned initial value generation operation shown in FIG. 12 can be adopted. On the other hand, when the value of "FIRST flag" is 0 and the error happened during the calculation of $f(X_n)$, the program proceeds from step S137 to S139, at which a value of (oldX+oldX2)/2 is set as $X_n$. To explain this more in detail, the value $X_n$ having caused the error is stored in the memory "oldX" and the value of the preceding $X_{n-1}$ is stored in the memory "oldX2" respectively. Then the value (oldX+oldX2)/2 at the point of bisection between oldX and oldX2 is calculated and is set as the value $X_n$. Thereafter, the program returns to S134, and the iterative operation using the newly set value $X_n$ is again performed. If the same error happens with the new $X_n$=(oldX+oldX2)/2, the memory oldX2 retains the value of $X_{n-1}$ while the error is occurring. Only the value of "oldX" is renewed such that the value of "oldX" approaches the value of "oldX2" until there is no error. If there is no operation error and the solution is correctly calculated at step S135, the arithmetic processing finishes.

As described above, in this arithmetic processing of FIGS. 13 and 14, even if the value $X_n$ enters an undefined region and causes an error, the iterative operation is continued, whereby the possibility to get the solution becomes stronger than in the conventional method. Further, it is possible to get the solution from the initial value having a wider range.

If the calculation at step S134 for the first initial value results in an error, $X_{n-1}$ does not exist and therefore the value of "oldX2" is not defined. For this reason, it is impossible to calculate the middle point of $X_{n-1}$ and $X_n$, that is, to calculate (oldX+oldX2)/2, at step S139. In this case the program proceeds to S138 and a new initial value is generated.

In this embodiment, the processing of FIG. 11, the processing of FIG. 12, and the processing of FIGS. 13 and 14 are all executed. However, it is not necessary to do so. Any one or two of them may be executed.

This calculating device of FIG. 7 can be designed to store numerical values with names which correspond to the numerical values and which each consist of one or more characters. This is achieved by providing, in addition to the numerical memory 6 having a plurality of memory areas, the code memory 7 to store control codes 01, 02, 03, 04, . . . to identify the memory areas of the numerical value memory 6 and the name memory 8 to store names in correspondence to the memory areas of the numerical memory 6, as shown in FIGS. 15–17.

The calculating device operates as follows when an operator uses the numerical memory 6. Here, assume that the following operations are performed.

(1) Giving a name "hankei" to a memory area of the numerical memory 6;

(2) Storing a value of 5 in the numerical memory; and (3) Inputting and calculating an expression "12×π×hankei."

Note that FIGS. 15–17 show the keys operated by the operator in the left column, display contents on the screen when the keys are operated in the middle column, and memory contents in the right column. The following description is made with reference to FIGS. 15–17.

(1) At first, at step (a), the operator pushes the [VAR] key and changes the display screen for selecting a memory area of the numerical memory and registering the name of the numerical memory area.

Next, at step (b), the operator key-inputs the variable name "hankei" and pushes the [ENTER] key. As a result, the name is given to the (first) one of the areas of the numerical memory 6 and registered in the name memory 8. Note that the key input operation for the name input may be before or during inputting of a mathematical expression or a program. When the operator pushes the [QUIT] key at step (c), the display screen is returned to the expression input screen.

(2) Next, at step (c), following the operation of the [QUIT] key, the operator pushes the [5] key (this is a numerical key corresponding to the value to be stored in the above-mentioned first numerical memory area) and the [STO] key, and then the screen displays "5 →_", (the mark "_" indicates the cursor.)

Next, at step (d), the operator pushes the [VAR] key to change the display screen to the state allowing selection of the memory area and registration of the name.

Then, at step (e), the operator selects the number [1] indicating "hankei" by operating the [1] key. This operator's operation returns the display screen to the expression-inputtable screen now displaying "5→_", and the control code corresponding to the first numerical memory area is automatically inputted in the position of the cursor. As a result, the name "hankei" registered in correspondence to the first numerical memory area is accessed and displayed on the screen like "5→hankei." After that, the stored numerical value [5.] is displayed.

(3) Next, at step (f), the operator presses the [2], [×], [π], and [×] keys. Subsequently at step (g) the operator pushes the [VAR] key and changes the screen to the state allowing registration of the name and selection of the memory area.

Next, at step (h) the operator selects the first numerical memory area by selecting the number "1" followed by the name "hankei". As a result, the display screen again returns to the expression-inputtable state and displays the expression "2×π×hankei_". When at step (i) the operator pushes the [ENTER] key, the expression is calculated and the calculation result "31.415926" is displayed.

On the other hand, when the numerical memory is not used, the calculating device displays data inputted by the pushed key in the procedure similar to that in the common function calculators. For example, as shown in FIG. 19A, if the operator pushes the [sin] key (which is a key to compute a sine function), a control code "11" corresponding to the pushed key [sin] is stored into the input buffer in the RAM 5, as shown in FIG. 19B. Next, as shown in FIG. 19C, the control code "11" is analyzed to be extended to a string of display character codes (a display code string) "53", "49", "4E" for the display and this display code string "53", "49", "4E" is stored in the display buffer in the RAM 5. Next, as shown in FIG. 19D, a string of characters "sin" corresponding to the display code string in the display buffer is displayed in the display part 1 of the device. FIG. 20 shows other examples of input keys, control codes stored in the input buffer, display codes stored in the display buffer, and display contents.

The following describes the operation of the CPU 3 in response to the operator's key operations, with reference to FIG. 18.

At first, in a case where there is a key input or key operation, the CPU 3 judges, at step S1, whether the key (the input key) is the [VAR] key or not, in other words, whether the operated key is a key requesting to change the screen to the memory selection screen and to register the name of a numerical memory area.

If the input key is not the [VAR] key, the program proceeds to step S2 at which a control code corresponding to the input key is stored in the input buffer in the RAM 5. Next, at step S3, it is judged whether or not the stored code is a code of a numerical memory area. If it is the code of a numerical memory area, the name corresponding to the code is read out from the corresponding area of the name memory 7, and a name code string of the name read out is stored as an extended display code string in the display buffer of the RAM 5 at step S13. On the other hand, if the code is not a code of a numerical memory area, a preset display code string corresponding to the code is stored in the display buffer at step S4, as described in more detail later. Next, storage contents of the display buffer, which have been stored at step S13 or S4, are displayed at step S5. Next, a calculation is performed depending on the nature of the input key and the key state. More specifically, the control code of the input key is a calculation execution code, a calculation is performed and the calculation result is displayed on the screen at step S14. After that, the program returns to step S1 and a further key input is awaited.

In the case that the input key is the [VAR] key at step S1, the programs proceeds to step S6 at which, when there is a further key input, it is discriminated whether or not the input key is the [QUIT] key. If yes, the device is returned to the original state at step S9 and the program returns to step S1. If the key input at step S6 is not the [QUIT] key, the program proceeds to step S7 wherein it is discriminated whether the input key is a numerical key. If it is a numerical key, judging that the numerical memory area corresponding to the number indicated by the key has been selected, the CPU 3 stores the control code corresponding to the numerical memory area in the input buffer at step S8. Thereafter, the aforementioned processing at steps S3–S14 is executed and then the program returns to step S1 wherein a further key input is awaited.

In the case that the input key is judged not to be a numerical key at step S7, the program proceeds to step S10 wherein, if the input key indicates a character, which constitutes a name of the numerical memory, the character is displayed on the screen. Then at step S11, it is discriminated whether or not a next input key is the [ENTER] key. If the input key is not the [ENTER] key, the program returns to step S10 and maintains the operation of inputting the name of the numerical memory until the [ENTER] key is operated. When it is discriminated that the [ENTER] key has been inputted at step S11, the input name input of the numerical memory area is stored in the name memory (S12). Thereafter, the program returns to step S6.

This calculating device makes the calculating operation as easily as common function calculators do by using the control codes corresponding to the numerical memory areas.

Furthermore, since names corresponding to the numerical memory areas and being previously stored in the name memory are presented on the display part 1, the operator can identify the desired numerical memory area by its name and can use data stored in the numerical memory area for the calculation of an expression, equation, etc.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A calculating device comprising:

input device for inputting data;

controller for executing arithmetic processing on the input data by an iterative method based on an input mathematical expression, an input initial value for a variable contained in the mathematical expression, and an input solution existing range in which a solution of the input mathematical expression is expected to exist, each input through the input device;

display device for displaying various data including input data and results of the arithmetic processing;

an upper limit memory for storing an input upper limit of the solution existing range; and a lower limit memory for storing an input lower limit of the solution existing range, said controller comparing, after calculating a value $X_{n+1}$ through an (n+1)th iterative operation based on the mathematical expression from a value $X_n$ resulting from an n'th iterative operation based on the mathematic expression, the value $X_{n+1}$ and $X_n$, controlling, when $X_{n+1}$ is larger than $X_n$, the lower limit memory to store the value $X_n$ as a new lower limit of the solution existing range, controlling, when $X_{n+1}$ is smaller than $X_n$, the upper limit memory to store the value $X_n$ as a new upper limit of the solution existing range, determining whether $X_{n+1}$ is within the solution existing range, performing, when the value $X_{n+1}$ is determined to be within the solution existing range, a (n+2)th iterative operation, and stopping arithmetic processing based on the input mathematical expression when the value $X_{n+1}$ is not determined to be within the solution existing range.

2. The device of claim 1, wherein the controller uses one of the upper and lower limits of the input solution existing range as an initial value for a first series of iterative operations based on the mathematic expression and the other of the upper and lower limits as an initial value for a second series of iterative operations based on the mathematical expression, and uses, as an initial value, in further series of iterative operations, a value selected from values positioned at points dividing the input solution existing range into $2^m$ (m=1, 2, . . .), while successively increasing degree "m" from the least degree "1", that is at a farthest point from a point of an immediately preceding initial value.

3. The device of claim 1, further comprising:

a first memory for storing the value $X_n$ resulting from the n'th iterative operation; and a second memory for storing a value $X_{n+1}$ resulting from an (n−1)th iterative operation, wherein the controller calculates, when an operation error occurs during the (n+1)th iterative operation when attempting to calculate the value $X_{n+1}$, an average of the values $X_n$ and $X_{n+1}$ stored in the first and second memories, respectively, as a new $X_n$ and calculates the value $X_{n+1}$ based upon the new value of $X_n$.

4. The device of claim 2, further comprising:

a first memory for storing the value $X_n$ resulting from the n'th iterative operation; and a second memory for storing a value $X_{n+1}$ resulting from an (n−1)th iterative operation, wherein the controller calculates, when an operation error occurs during the (n+1)th iterative operation when attempting to calculate the value $X_{n+1}$, an average of the values $X_n$ and $X_{n+1}$ stored in the first and second memories, respectively, as a new $X_n$ and calculates the value $X_{n+1}$ based upon the new value of $X_n$.

5. The device of claim 1, further comprising:

an input buffer for storing a control code representative of data inputted through the input device;

a display buffer for storing a display code string representative of a character string corresponding to the control code stored in the input buffer, the character string being displayed on the display device;

a numerical memory for storing numerical values in respective memory areas of the numerical memory;

a code memory for storing control codes to identify the respective memory areas of the numerical memory; and a name memory for storing names, each including one or more characters, and each inputted in correspondence with a numerical value stored in the numerical memory, wherein the controller reads out, when a memory area of the numerical memory is selected, the control code corresponding to the selected memory area from the code memory and stores the control code in the input buffer to use the control code in the arithmetic processing and reads out the name corresponding to the selected memory area from the name memory and stores the read out name in the display buffer for display on the display device.

6. A calculating device comprising:

input device for inputting data;

controller for executing arithmetic processing on the input data by an iterative method based on an input mathematical expression, an input initial value for a variable contained in the mathematical expression, and an input solution existing range in which a solution of the input mathematical expression is expected to exist, each input through the input device; and display device for displaying various data including input data and results of the arithmetic processing, the controller using one of upper and lower limits of the input solution existing range as an initial value for a first series of iterative operations based on the mathematic expression and the other of the upper and lower limits as an initial value for a second series of iterative operations based on the mathematic expression, and using as an initial value, in further series of iterative operations, a value selected from values positioned at points dividing the input solution existing range into $2^m$ (m=1, 2, . . .), while successively increasing degree "m" from the least degree "1", that is at a farthest point from a point of an immediately preceding initial value.

7. The device of claim 6, further comprising:

an input buffer for storing a control code representative of data inputted through the input device;

a display buffer for storing a display code string representative of a character string corresponding to the control code stored in the input buffer, the character string being displayed on the display device;

a numerical memory for storing numerical values in respective memory areas of the numerical memory;

a code memory for storing control codes to identify the respective memory areas of the numerical memory; and a name memory for storing names, each including one or more characters, and each inputted in correspondence with a numerical value stored in the numerical memory, wherein the controller reads out, when a memory area of the numerical memory is selected, the control code corresponding to the selected memory area from the code memory and stores the control code in the input buffer to use the control code in the arithmetic processing and reads out the name corresponding to the selected memory area and stores the read out name in the display buffer for display on the display device.

8. The device of claim 6, further comprising:

a first memory for storing a value $X_n$ resulting from an n'th iterative operation; and a second memory for storing a value $X_{n+1}$ resulting from an (n−1)th iterative operation, where the controller calculates, when an operation error occurs during an (n+1)th iterative operation when attempting to calculate a value $X_{n+1}$, an average of the values $X_n$ and $X_{n+1}$ stored in the first and second memories, respectively, as a new $X_n$ and calculates the value $X_{n+1}$ based upon the new value of $X_n$.

9. A calculating device comprising:

input device for inputting data;

controller for executing arithmetic processing on the input data by an iterative method based on an input mathematical expression, an input initial value for a variable contained in the mathematical expression, and an input solution existing range in which a solution of the input mathematical expression is expected to exist, each input through the input device;

display device for displaying various data including input data and results of the arithmetic processing;

a first memory for storing a value $X_n$ resulting from an n'th iterative operation; and a second memory for storing a value $X_{n+1}$, resulting from an (n−1)th iterative operation, wherein the controller calculates, when an operation error occurs during an (n+1)th iterative operation when attempting to calculate a value $X_{n+1}$, an average of the values $X_n$ and $X_{n+1}$ stored in the first and second memories, respectively, as a new $X_n$ and calculates the value $X_{n+1}$ based upon the new value of $X_n$.

10. The device of claim 9, further comprising:

an input buffer for storing a control code representative of data inputted through the input device;

a display buffer for storing a display code string representative of a character string corresponding to the control code stored in the input buffer, the character string being displayed on the display device;

a numerical memory for storing numerical values in respective memory areas of the numerical memory;

a code memory for storing control codes to identify the respective memory areas of the numerical memory; and a name memory for storing names, each including one or more characters, and each inputted in correspondence with a numerical value stored in the numerical memory, wherein the controller reads out, when a memory area of the numerical memory is selected, the control code corresponding to the selected memory area from the code memory and stores the control code in the input buffer to use the control code in the arithmetic processing and reads out the name corresponding to the selected memory area and stores the read out name in the display buffer for display on the display device.

* * * * *